US012684468B2

(12) United States Patent
Li et al.

(10) Patent No.: US 12,684,468 B2
(45) Date of Patent: Jul. 14, 2026

(54) METHOD AND USER EQUIPMENT FOR CELL SELECTION

(71) Applicant: MediaTek Singapore Pte. Ltd., Singapore (SG)

(72) Inventors: Xin Li, Beijing (CN); Jun Hu, Beijing (CN); Lei Zhang, Beijing (CN); Zhen Song, Beijing (CN); Hongwei Zhang, Beijing (CN); Quanping Wang, Beijing (CN); Guangpu Wang, Beijing (CN); Pan Gao, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 388 days.

(21) Appl. No.: 18/366,909

(22) Filed: Aug. 8, 2023

(65) Prior Publication Data

US 2025/0008420 A1     Jan. 2, 2025

(30) Foreign Application Priority Data

Jun. 27, 2023     (CN) .......................... 202310790772.9

(51) Int. Cl.
H04W 48/16 (2009.01)
H04W 48/20 (2009.01)

(52) U.S. Cl.
CPC ........... H04W 48/16 (2013.01); H04W 48/20 (2013.01)

(58) Field of Classification Search
CPC .............................. H04W 48/16; H04W 48/20

USPC .......................................................... 455/434
See application file for complete search history.

(56) References Cited

U.S. PATENT DOCUMENTS

| | | | | |
|---|---|---|---|---|
| 12,256,325 | B2 * | 3/2025 | Zhang .................... | H04W 48/20 |
| 2013/0252614 | A1 * | 9/2013 | Hsu ........................ | H04W 48/20 455/437 |
| 2024/0114418 | A1 * | 4/2024 | Kumar ................... | H04W 36/30 |

FOREIGN PATENT DOCUMENTS

WO      WO-2023/018301 A1 *   2/2023   ............ H04W 48/12

OTHER PUBLICATIONS

TSG-RAN Working Group 2—Radio layer 2 and Radio layer 3—TSGR2-6 99808—Aug. 1999 (Year: 1999).*

(Continued)

*Primary Examiner* — Rafael Pérez-Gutiérrez
*Assistant Examiner* — Aaron C. Deditch
(74) *Attorney, Agent, or Firm* — McClure, Qualey & Rodack, LLP

(57)     ABSTRACT

A method for cell selection is provided. The method may include the following steps. A user equipment (UE) may determine whether a current cell is a power-saving cell, a high-throughput cell or a power-saving and high-throughput cell based on a plurality of parameters configured by a network node. Then, the UE may determine whether to perform a cell selection in response to the current cell being a power-saving cell, a high-throughput cell or a power-saving and high-throughput cell.

12 Claims, 4 Drawing Sheets

(56) References Cited

OTHER PUBLICATIONS

Evaluation process for Cell selection in LTE—09192012 (Year: 2012).*

3GPP TS 38.331 V15.2.0—Jun. 2018 (Year: 2018).*

ETSI TS 138 213 V15.3.0—Oct. 2018 (Year: 2018).*

SS PBCH Block Design in 5G New Radio NR—2018 (Year: 2018).*

5G NR—Synchronization Signal-PBCH block SSB—Oct. 5, 2019 (Year: 2019).*

End-to-End congestion control approaches for high throughput and low delay in 4G-5G cellular networks—2021 (Year: 2021).*

What is 5G Massive MIMO technology and how does it work—Oct. 16, 2021 (Year: 2021).*

Cellular traffic prediction with machine learning—A survey—Sep. 1, 2022 (Year: 2022).*

* cited by examiner

S410 determine whether a current cell is a power saving cell, a high throughput cell or a power saving and high throughput cell based on a plurality of parameters configured by a network node

S420 determine whether to perform a cell selection in response to the current cell being a power saving cell, a high throughput cell or a power saving and high throughput cell

METHOD AND USER EQUIPMENT FOR CELL SELECTION

CROSS REFERENCE TO RELATED APPLICATIONS

This application claims the benefits of CN patent application No. 202310790772.9 filed on Jun. 27, 2023, the entirety of which is incorporated by reference herein.

BACKGROUND OF THE INVENTION

Field of the Invention

The invention generally relates to mobile communications, and more particularly, to a cell selection technology with respect to user equipment (UE) and a network apparatus in mobile communications.

Description of the Related Art

GSM/GPRS/EDGE technology is also called 2G cellular technology, WCDMA/CDMA-2000/TD-SCDMA technology is also called 3G cellular technology, and LTE/LTE-A/TD-LTE technology is also called 4G cellular technology. These cellular technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

In conventional communication technology, a cell with more multi-input multi-output (MIMO) layers (e.g., 8 transmission antennas and 8 reception antennas (8T8R)) may be configured (i.e., high-throughput cells may be configured), and a cell with fewer multi-input multi-output (MIMO) layers (e.g., 2T2R) may be configured (i.e., power-saving cells may be configured). However, when a UE is in an outdoor area, the UE may not need heavy data traffic for power saving. Alternatively, when the UE is in an indoor area, the UE may need heavy data traffic for high throughput.

Therefore, how to perform cell selection more flexibly and efficiently to find a suitable cell for the UE is a topic that is worthy of discussion.

BRIEF SUMMARY OF THE INVENTION

A method and user equipment (UE) for cell selection are provided to overcome the problems mentioned above.

An embodiment of the invention provides a method for cell selection. The method may comprise the following steps. The UE may determine whether a current cell is a power-saving cell, a high-throughput cell or a power-saving and high-throughput cell based on a plurality of parameters configured by a network node. Then, the UE may determine whether to perform a cell selection in response to the current cell being a power-saving cell, a high-throughput cell or a power-saving and high-throughput cell.

In some embodiments, the parameters may comprise ss-PBCH-BlockPower, path loss, transmission (Tx) power, the number of multi-input multi-output (MIMO) layers, and bandwidth.

In some embodiments, the UE may determine that the current cell is the power-saving cell in response to the ss-PBCH-BlockPower, the path loss or the Tx power being lower than a threshold.

In some embodiments, the UE may determine that the current cell is the high-throughput cell in response to the number of multi-input multi-output (MIMO) layers being higher than the threshold and the bandwidth being a larger bandwidth.

In some embodiments, the UE may determine a service traffic in response to the current cell being the power-saving cell or the high-throughput cell.

In some embodiments, the UE may perform the cell selection in response to the current cell being the high-throughput cell and the service traffic being light.

In some embodiments, the UE may perform the cell selection in response to the current cell being the power-saving cell and the service traffic being heavy.

In some embodiments, the UE may determine to stay in the current cell in response to the current cell being the high-throughput cell and the service traffic being heavy or in response to the current cell being the power-saving cell and the service traffic being light.

In some embodiments, the UE may determine to stay in the current cell in response to the current cell being the power-saving and high-throughput cell.

In some embodiments, the UE may determine whether the UE has a power-saving neighbor cell or a high-throughput neighbor cell before performing the cell selection.

An embodiment of the invention provides a user equipment (UE) for cell selection. The UE may comprise a processor. The processor may determine whether a current cell is a power-saving cell, a high-throughput cell or a power-saving and high-throughput cell based on a plurality of parameters configured by a network node. In addition, the processor may determine whether to perform a cell selection in response to the current cell being a power-saving cell, a high-throughput cell or a power-saving and high-throughput cell.

Other aspects and features of the invention will become apparent to those with ordinary skill in the art upon review of the following descriptions of specific embodiments of the method and UE for cell selection.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
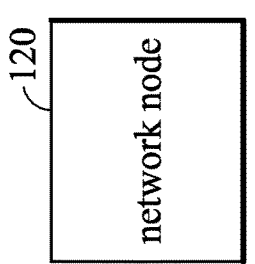
FIG. 1 is a block diagram of a wireless communications system 100 according to an embodiment of the invention.
Figure 1:
Figure 1:
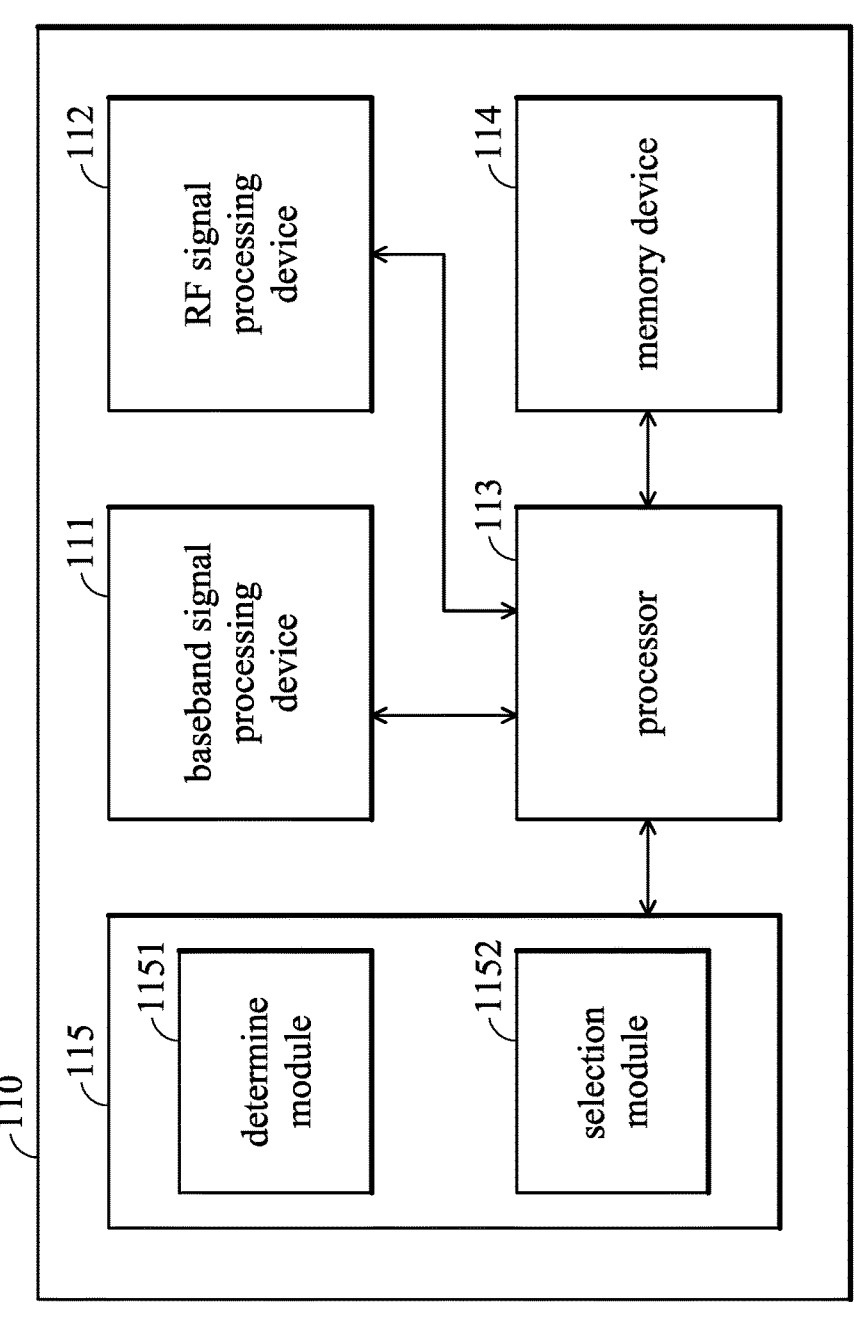

FIG. 1 is a block diagram of a wireless communications system 100 according to an embodiment of the invention. As shown in FIG. 1, the wireless communications system 100 may comprise user equipment (UE) 110 and a network node 120. It should be noted that in order to clarify the concept of the invention, FIG. 1 presents a simplified block diagram in which only the elements relevant to the invention are shown. However, the invention should not be limited to what is shown in FIG. 1.

In the embodiments, the network node 120 may be a base station, a gNodeB (gNB), a NodeB (NB) an eNodeB (eNB), an access point, an access terminal, but the invention should not be limited thereto. In the embodiments, the UE 110 may communicate with the network node 120 through the fourth generation (4G) communication technology, fifth generation (5G) communication technology, but the invention should not be limited thereto.

As shown in FIG. 1, the UE 110 may comprise at least a baseband signal processing device 111, a radio frequency (RF) signal processing device 112, a processor 113, a memory device 114, and function modules and circuits 115. The network node 120 may comprise similar devices or elements as UE 110.

In the embodiments of the invention, the UE 110 may be a smartphone, Personal Data Assistant (PDA), pager, laptop computer, desktop computer, wireless handset, or any computing device that includes a wireless communications interface.

The RF signal processing device 112 may be a transceiver. The RF signal processing device 112 may comprise a plurality of antennas to receive or transmit RF signals. The RF signal processing device 112 may receive RF signals via the antennas and process the received RF signals to convert the received RF signals to baseband signals to be processed by the baseband signal processing device 111, or receive baseband signals from the baseband signal processing device 111 and convert the received baseband signals to RF signals to be transmitted to a peer communications apparatus. The RF signal processing device 112 may comprise a plurality of hardware elements to perform radio frequency conversion. For example, the RF signal processing device 112 may comprise a power amplifier, a mixer, analog-to-digital converter (ADC)/digital-to-analog converter (DAC), etc.

The baseband signal processing device 111 may further process the baseband signals to obtain information or data transmitted by the peer communications apparatus. The baseband signal processing device 111 may also comprise a plurality of hardware elements to perform baseband signal processing.

The processor 113 may control the operations of the baseband signal processing device 111, the RF signal processing device 112, the memory device 114 and the function modules and circuits 115. According to an embodiment of the invention, the processor 113 may also be arranged to execute the program codes of the software modules of the corresponding baseband signal processing device 111, the RF signal processing device 112 and the function modules and circuits 115. The program codes accompanied by specific data in a data structure may also be referred to as a processor logic unit or a stack instance when being executed. Therefore, the processor 113 may be regarded as being comprised of a plurality of processor logic units, each for executing one or more specific functions or tasks of the corresponding software modules.

The memory device 114 may store the software and firmware program codes, system data, user data, etc. of the UE 110. The memory device 114 may be a volatile memory such as a Random Access Memory (RAM); a non-volatile memory such as a flash memory or Read-Only Memory (ROM); a hard disk; or any combination thereof.

According to an embodiment of the invention, the RF signal processing device 112 and the baseband signal processing device 111 may collectively be regarded as a radio module capable of communicating with a wireless network to provide wireless communications services in compliance with a predetermined Radio Access Technology (RAT). Note that, in some embodiments of the invention, the UE 110 may be extended further to comprise more than one antenna and/or more than one radio module, and the invention should not be limited to what is shown in FIG. 1.

The function modules and circuits 115 may comprise a determine module 1151 and a selection module 1152. The processor 113 may execute different modules or circuits in the function modules and circuits 115 to perform embodiments of the present invention. In the embodiment of the invention, the determine module 1151 may determine a cell type of current cell and determine whether to perform cell selection. The selection module 1152 may perform the cell selection.

According to an embodiment of the invention, the baseband signal processing device 111 and the RF signal processing device 112 may be configured in a modem (MD) of the UE 110, and the processor 113 may be configured in an application processor (AP) of the UE 110. According to an embodiment of the invention, the function modules and circuits 115 may be configured in the modem or AP of the UE 110.

According to an embodiment of the invention, the UE 110 may determine a cell type of a current cell (i.e., current serving cell) which the UE 110 is camping on based on a plurality of parameters configured by the network node 120. Specifically, the UE 110 may determine whether the current cell is a power-saving cell, a high-throughput cell, or a power-saving and high-throughput cell (i.e., the cell is power-saving cell and high-throughput cell) based on the parameters configured by the network node 120.

According to an embodiment of the invention, the parameters may comprise synchronization signal (ss)-physical broadcast channel (PBCH)-BlockPower, reference signal received power (RSRP), signal to interference plus noise ratio (SINR), path loss, transmission (Tx) power, the number of multi-input multi-output (MIMO) layers, and bandwidth.

In an embodiment, the UE 110 may determine whether the current cell is a power-saving cell based on at least one of ss-PBCH-BlockPower, path loss and Tx power. In an example, if the ss-PBCH-BlockPower is low (e.g., the ss-PBCH-BlockPower may be lower than a threshold, e.g., 0), the path loss is low (e.g., the path loss may be lower than a threshold) or the Tx power is low (e.g., the Tx power may be lower than a threshold, e.g., 5 dbm), the UE 110 may determine that the current cell is a power-saving cell.

In another embodiment, the UE 110 may determine whether the current cell is a high-throughput cell based on the number of MIMO layers and the bandwidth. In an example, if the number of MIMO layers is higher than or equal to the threshold (e.g., the number of MIMO layers is higher than or equal to 4, i.e., the number of Tx (or Rx) antennas is higher than or equal to 4) and the bandwidth is a larger bandwidth compared with neighbor cell's, the UE 110 may determine that the current cell is a high-throughput cell.

When the current cell meets the conditions of the power-saving cell and the high-throughput cell at the same time, the UE 110 may determine that the current cell is a power-saving and high-throughput cell.

When the UE 110 determines that the current cell is a power-saving cell or a high-throughput cell, the UE 110 may determine whether to perform a cell selection to find another serving cell. Specifically, when the UE 110 determines that the current cell is a high-throughput cell or a power saving, the UE 110 may determine that the service traffic is a light traffic or a heavy traffic first.

If the current cell is a high-throughput cell and the service traffic is a light traffic (i.e., a power-saving cell may be more suitable), the UE 110 may further determine whether the UE 110 has a power-saving neighbor cell. For example, the UE 110 may determine whether there is a power-saving neighbor cell which the UE 110 has camped on. If the UE 110 has a power-saving neighbor cell, the UE 110 may perform cell selection to the power-saving neighbor cell for power saving (e.g., handover to the power-saving neighbor cell). If the UE 110 has not a power-saving neighbor cell, the UE 110 may perform cell selection based on the legacy standard.

If the current cell is a high-throughput cell and the service traffic is a heavy traffic (i.e., a high-throughput cell may be more suitable), the UE 110 may stay in the current cell (i.e., high-throughput cell).

If the current cell is a power-saving cell and the service traffic is a heavy traffic (i.e., a high-throughput cell may be more suitable), the UE 110 may further determine whether the UE 110 has a high-throughput neighbor cell. For example, the UE 110 may determine whether there is a high-throughput neighbor cell which the UE 110 has camped on. If the UE 110 has a high-throughput neighbor cell, the UE 110 may perform cell selection to the high-throughput neighbor cell for the high throughput. If the UE 110 has not a high-throughput neighbor cell, the UE 110 may perform cell selection based on the legacy standard.

If the current cell is a power-saving cell and the service traffic is a light traffic (i.e., a power-saving cell may be more suitable), the UE 110 may stay in the current cell (i.e., power-saving cell).

When the UE 110 determines that the current cell is a power-saving and high-throughput cell, the UE 110 may stay in the current cell.

It should be noted that, in the embodiments of the invention, the UE 110 may adopt any suitable method to determine whether the service traffic is a light traffic or a heavy traffic.

According to an embodiment of the invention, the UE 110 may further determine the current environmental scenario (e.g., platform of the subway, tunnel of the subway, office, shopping mall, and so on) corresponding to the UE 110. In an embodiment, the UE 110 may use machine learning (or deep learning) algorithm to determine the current environmental scenario. The UE 110 may further consider current environmental scenario to determine whether to perform cell selection to a suitable cell.

Figure 2:
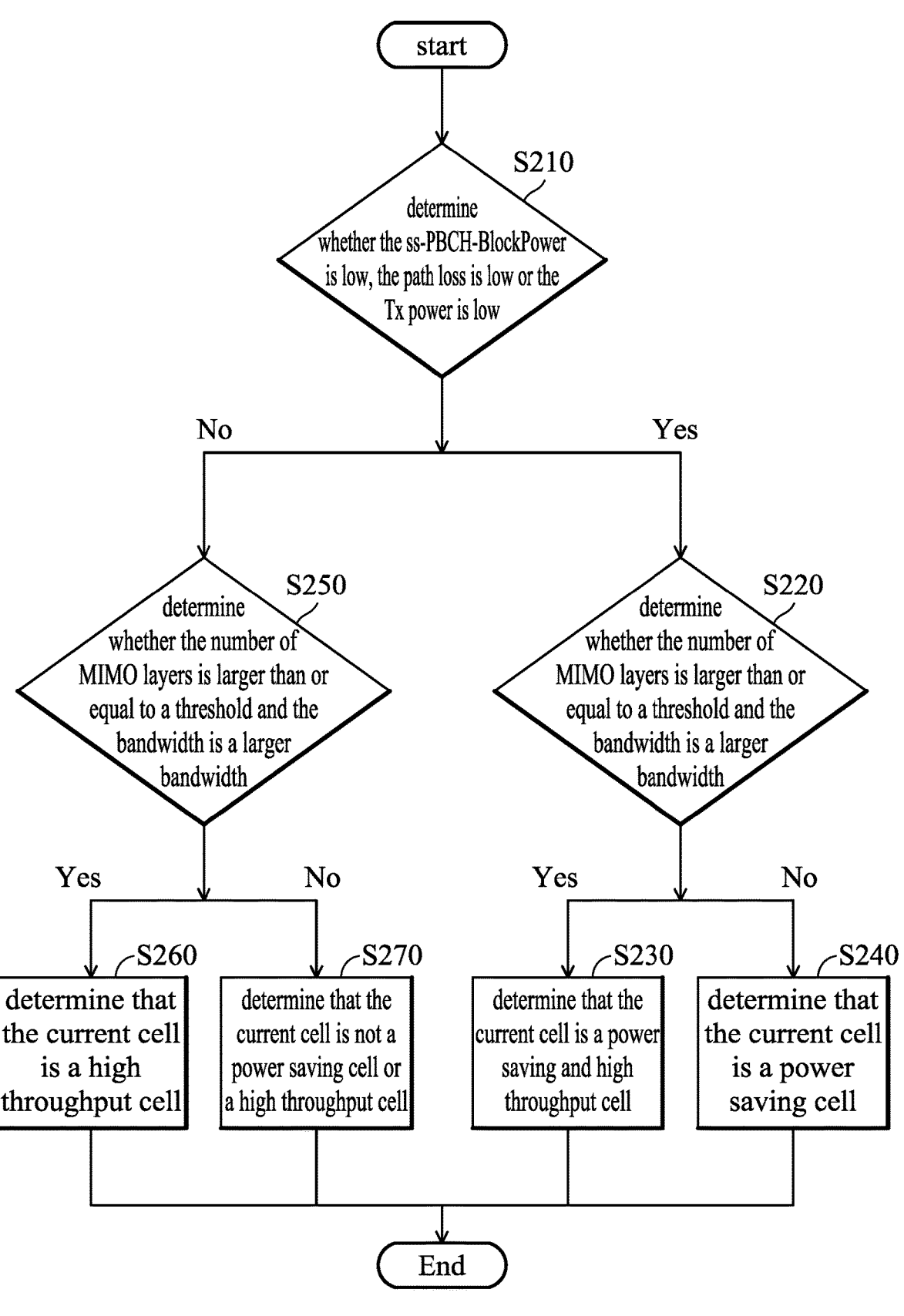
FIG. 2 is a flow chart illustrating a cell detection according to an embodiment of the invention.

FIG. 2 is a flow chart illustrating a cell detection according to an embodiment of the invention. The cell detection may be applied to the UE 110. In step S210, the UE 110 may determine whether the ss-PBCH-BlockPower is low (e.g., the ss-PBCH-BlockPower may be lower than a threshold), the path loss is low (e.g., the path loss may be lower than a threshold) or the Tx power is low (e.g., the Tx power may be lower than a threshold).

If the ss-PBCH-BlockPower is low (e.g., the ss-PBCH-BlockPower is lower than a threshold), the path loss is low (e.g., the path loss is lower than a threshold) or the Tx power is low (e.g., the Tx power lower than a threshold), step S220 may be performed. In step S220, the UE 110 may determine whether the number of MIMO layers is higher than or equal to a threshold and the bandwidth is a larger bandwidth.

If the number of MIMO layers is higher than or equal to a threshold (i.e., high layer) and the bandwidth is a larger bandwidth, step S230 may be performed. In step S230, the UE 110 may determine that the current cell is a power-saving and high-throughput cell.

If the number of MIMO layers is smaller than a threshold and the bandwidth is not a larger bandwidth, step S240 may be performed. In step 240, the UE 110 may determine that the current cell is a power-saving cell.

If the ss-PBCH-BlockPower, the path loss, or the Tx power is not low, step S250 is performed. In step S250, the UE 110 may determine whether the number of MIMO layers is higher than or equal to a threshold and the bandwidth is a larger bandwidth.

If the number of MIMO layers is higher than or equal to a threshold (i.e., high layer) and the bandwidth is a larger bandwidth, step S260 is performed. In step S260, the UE 110 may determine that the current cell is a high-throughput cell.

If the number of MIMO layers is smaller than a threshold (i.e., high layer) and the bandwidth is not a larger bandwidth, step S270 is performed. In step 270, the UE 110 may determine that the current cell is not a power-saving cell or a high-throughput cell.

Figure 3:
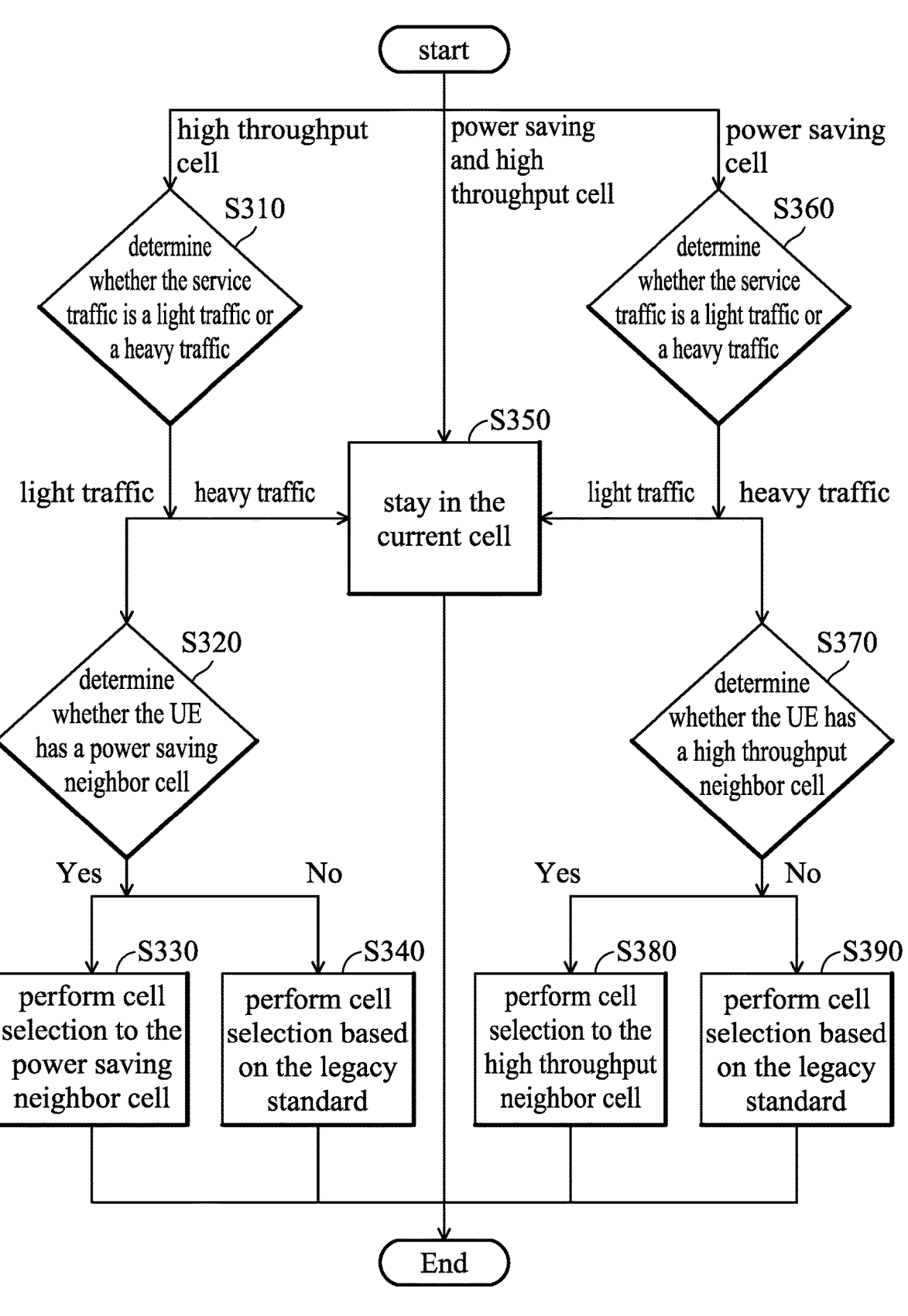
FIG. 3 is a flow chart illustrating a cell selection according to an embodiment of the invention.

FIG. 3 is a flow chart illustrating a cell selection according to an embodiment of the invention. The cell selection may be applied to the UE 110. In step S310, when the current cell is a high-throughput cell, the UE 110 may determine whether the service traffic is a light traffic or a heavy traffic.

If the service traffic is a heavy traffic, step S350 is performed. In step S350, the UE 110 may stay in the current cell.

If the service traffic is a light traffic, step S320 is performed. In step S320, the UE 110 may determine whether the UE 110 has a power-saving neighbor cell.

If the UE 110 has a power-saving neighbor cell, step S330 is performed. In step S330, the UE 110 may perform cell selection to the power-saving neighbor cell.

If the UE 110 has not a power-saving neighbor cell, step S340 is performed. In step S340, the UE 110 may perform cell selection based on the legacy standard.

In step S360, when the current cell is a power-saving cell, the UE 110 may determine whether the service traffic is a light traffic or a heavy traffic.

If the service traffic is a light traffic, step S350 is performed. In step S350, the UE 110 may stay in the current cell.

If the service traffic is a heavy traffic, step S370 is performed. In step S370, the UE 110 may determine whether the UE 110 has a high-throughput neighbor cell. If the service traffic is a light traffic, step S350 is performed. In step S350, the UE 110 may stay in the current cell.

If the UE 110 has a high-throughput neighbor cell, step S380 is performed. In step S380, the UE 110 may perform cell selection to the high-throughput neighbor cell.

If the UE 110 has not a high-throughput neighbor cell, step S390 is performed. In step S390, the UE 110 may perform cell selection based on the legacy standard.

In addition, if the current cell is a power-saving and high-throughput cell, step S350 is performed. In step S350, the UE 110 may stay in the current cell.

Figure 4:
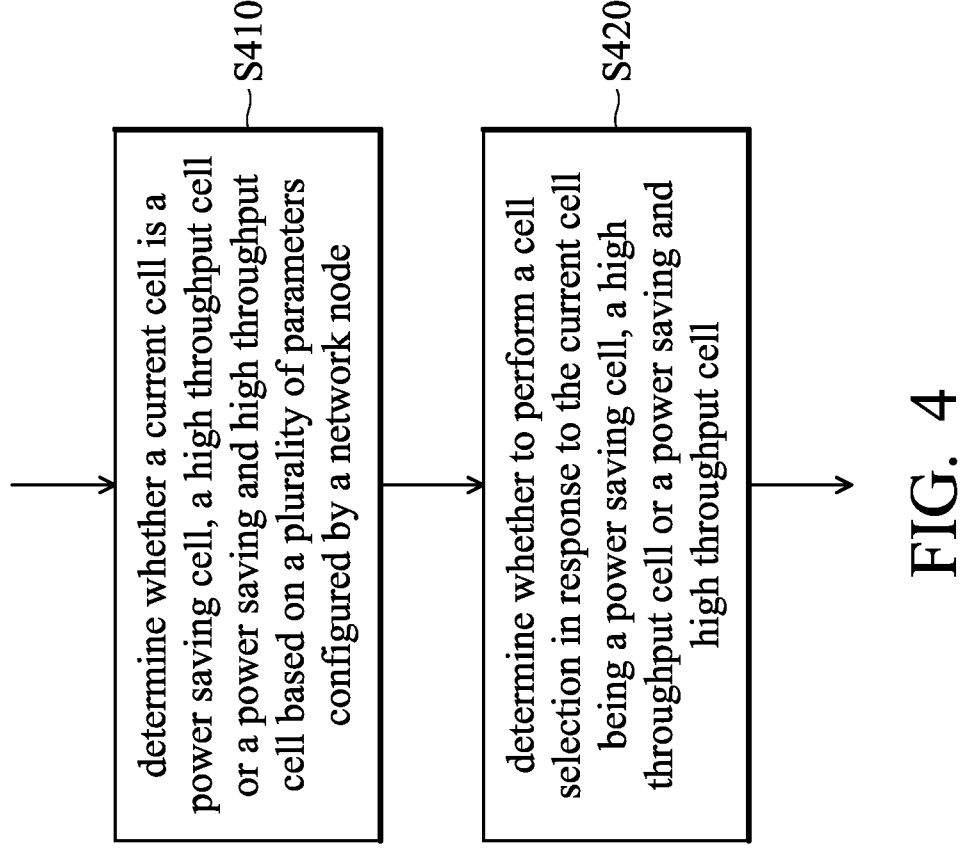
FIG. 4 is a flow chart illustrating a method for cell selection according to an embodiment of the invention.

FIG. 4 is a flow chart illustrating a method for cell selection according to an embodiment of the invention. The method can be applied to the wireless communications system 100. As shown in FIG. 4, in step S410, the UE 110 may determine whether a current cell is a power-saving cell, a high-throughput cell or a power-saving and high-throughput cell based on a plurality of parameters configured by a network node.

In step S420, the UE may determine whether to perform a cell selection in response to the current cell being a power-saving cell, a high-throughput cell or a power-saving and high-throughput cell.

In some embodiments of the invention, in the method, the parameters may comprise ss-PBCH-BlockPower, path loss, transmission (Tx) power, the number of multi-input multi-output (MIMO) layers, and bandwidth.

In some embodiments of the invention, in the method, in response to the ss-PBCH-BlockPower, the path loss or the Tx power being lower than a threshold, the UE 110 may further determine that the current cell is the power-saving cell.

In some embodiments of the invention, in the method, in response to the number of multi-input multi-output (MIMO) layers being higher than a threshold and the bandwidth being a larger bandwidth, the UE 110 may further determine that the current cell is the high-throughput cell.

In some embodiments of the invention, in the method, in response to the current cell being the power-saving cell or the high-throughput cell, the UE 110 may determine a service traffic. In an embodiment, in response to the current cell being the high-throughput cell and the service traffic being light, the UE 110 may perform the cell selection. In another embodiment, in response to the current cell being the power-saving cell and the service traffic being heavy, the UE 110 may perform the cell selection. In another embodiment, in response to the current cell being the high-throughput cell and the service traffic being heavy or in response to the current cell being the power-saving cell and the service traffic being light, the UE 110 may determine to stay in the current cell.

In some embodiments of the invention, in the method, the UE 110 may determine to stay in the current cell in response to the current cell being the power-saving and high-throughput cell.

In some embodiments of the invention, in the method, the UE 110 may determine whether the UE 110 has a power-saving neighbor cell or a high-throughput neighbor cell before performing the cell selection.

In the method for cell selection, the UE will be able to perform cell selection more flexibly and efficiently to find a suitable cell.

Use of ordinal terms such as "first", "second", "third", etc., in the disclosure and claims is for description. It does not by itself connote any order or relationship.

The steps of the method described in connection with aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in the UE. In the alternative, the processor and the storage medium may reside as discrete components in the UE. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for cell selection, comprising:

determining, by a processor of a user equipment (UE), whether a current cell is a power-saving cell, a high-throughput cell, or a power-saving and high-throughput cell based on a plurality of parameters configured by a network node;

determining, by the processor, whether to perform a cell selection in response to the current cell being a power-saving cell, a high-throughput cell, or a power-saving and high-throughput cell; and staying, by the processor, in the current cell in response to the current cell being the power-saving and high-throughput cell, wherein the parameters comprise ss-PBCH-BlockPower, path loss, transmission (Tx) power, a number of multi-input multi-output (MIMO) layers, and bandwidth, wherein the processor determines that the current cell is the power-saving cell in response to the ss-PBCH-BlockPower being lower than a first threshold, the path loss being lower than a second threshold, or the Tx power being lower than a third threshold;

wherein the processor determines that the current cell is the high-throughput cell in response to the number of multi-input multi-output (MIMO) layers being higher than a fourth threshold and the bandwidth being a larger bandwidth, and wherein the processor determines that the current cell is the power-saving and high-throughput cell in response to the ss-PBCH-BlockPower being lower than the first threshold, the path loss being lower than the second threshold, or the Tx power being lower than the third threshold, and in response to the number of MIMO layers being higher than the fourth threshold and the bandwidth being the larger bandwidth.

2. The method of claim 1, further comprising:

determining, by the processor, a service traffic in response to the current cell being the power-saving cell or the high-throughput cell.

3. The method of claim 2, further comprising:

performing, by the processor, the cell selection in response to the current cell being the high-throughput cell and the service traffic being suitable for the power-saving cell.

4. The method of claim 2, further comprising:

performing, by the processor, the cell selection in response to the current cell being the power-saving cell and the service traffic being suitable for the high-throughput cell.

5. The method of claim 2, further comprising:

determining, by the processor, to stay in the current cell in response to the current cell being the high-throughput cell and the service traffic being suitable for the high-throughput cell or in response to the current cell being the power-saving cell and the service traffic being suitable for the power-saving cell.

6. The method of claim 1, further comprising:

determining, by the processor, whether the UE has a power-saving neighbor cell or a high-throughput neighbor cell before performing the cell selection.

7. A user equipment (UE) for cell selection, comprising:

a processor, determining, whether a current cell is a power-saving cell, a high-throughput cell, or a power-saving and high-throughput cell based on a plurality of parameters configured by a network node, determining whether to perform a cell selection in response to the current cell being a power-saving cell, a high-throughput cell, or a power-saving and high-throughput cell, and staying in the current cell in response to the current cell being the power-saving and high-throughput cell, wherein the parameters comprise ss-PBCH-BlockPower, path loss, transmission (Tx) power, a number of multi-input multi-output (MIMO) layers, and bandwidth, wherein the processor determines that the current cell is the power-saving cell in response to the ss-PBCH-BlockPower being lower than a first threshold, the path loss being lower than a second threshold, or the Tx power being lower than a third threshold;

wherein the processor determines that the current cell is the high-throughput cell in response to the number of multi-input multi-output (MIMO) layers being higher than a fourth threshold and the bandwidth being a larger bandwidth, and wherein the processor determines that the current cell is the power-saving and high-throughput cell in response to the ss-PBCH-BlockPower being lower than the first threshold, the path loss being lower than the second threshold, or the Tx power being lower than the third threshold, and in response to the number of MIMO layers being higher than the fourth threshold and the bandwidth being the larger bandwidth.

8. The UE of claim 7, wherein the processor determines that a service traffic in response to the current cell being the power-saving cell or the high-throughput cell.

9. The UE of claim 8, wherein the processor performs the cell selection in response to the current cell being the high-throughput cell and the service traffic being suitable for the power-saving cell.

10. The UE of claim 8, wherein the processor performs the cell selection in response to the current cell being the power-saving cell and the service traffic being suitable for the high-throughput cell.

11. The UE of claim 8, wherein the processor determines to stay in the current cell in response to the current cell being the high-throughput cell and the service traffic being suitable for the high-throughput cell or in response to the current cell being the power-saving cell and the service traffic being suitable for the power-saving cell.

12. The UE of claim 7, wherein the processor determines whether the UE has a power-saving neighbor cell or a high-throughput neighbor cell before performing the cell selection.

* * * * *